United States Patent

[11] 3,591,118

| [72] | Inventors | Robert J. Gentile<br>Onandaga;<br>Arthur G. Martineau, Jr., Syracuse, both of, N.Y. |
|---|---|---|
| [21] | Appl. No. | 823,117 |
| [22] | Filed | May 8, 1969 |
| [45] | Patented | July 6, 1971 |
| [73] | Assignee | Gemini Products, Inc.<br>Syracuse, N.Y. |

[54] ANGULARLY ADJUSTABLE WIG BLOCK SUPPORT
2 Claims, 4 Drawing Figs.

[52] U.S. Cl. .................................................. 248/226,
248/288, 287/12, 269/75, 248/309
[51] Int. Cl. ........................................................ A47f 5/12,
F16c 11/06
[50] Field of Search .......................................... 248/181,
226.1, 229, 481, 482, 483; 287/12; 269/75; 306/7,
8, 9

[56] References Cited
UNITED STATES PATENTS

| 398,994 | 3/1889 | Andersen ..................... | 248/481 |
| 2,567,169 | 9/1951 | Green et al. .................. | 287/12 |
| 2,629,286 | 2/1953 | Budreck ....................... | 248/483 |
| 3,034,810 | 5/1962 | Primeau ....................... | 287/14 |
| 3,424,419 | 1/1969 | Siegel ............................ | 248/226 (.1) |
| 3,198,408 | 8/1965 | Benner ......................... | 248/122 X |

*Primary Examiner*—William H. Schultz
*Attorney*—Bruns and Jenney

ABSTRACT: An improved block support for simulated heads, called blocks, on which wigs are mounted for styling. The support includes a vertically extending shaft adapted at its top for connection to the block and a base portion having a clamp for securing it to a table and a horizontally extending plate. The plate has spherically rounded upper and annular portions through which the reduced, threaded lower end of the shaft extends. A locking nut on the threaded shaft is adapted to squeeze spherically curved annular members carried on the shaft against the upper and lower plate annular portions which are spaced from the shaft to allow the shaft to tilt.

PATENTED JUL 6 1971
3,591,118
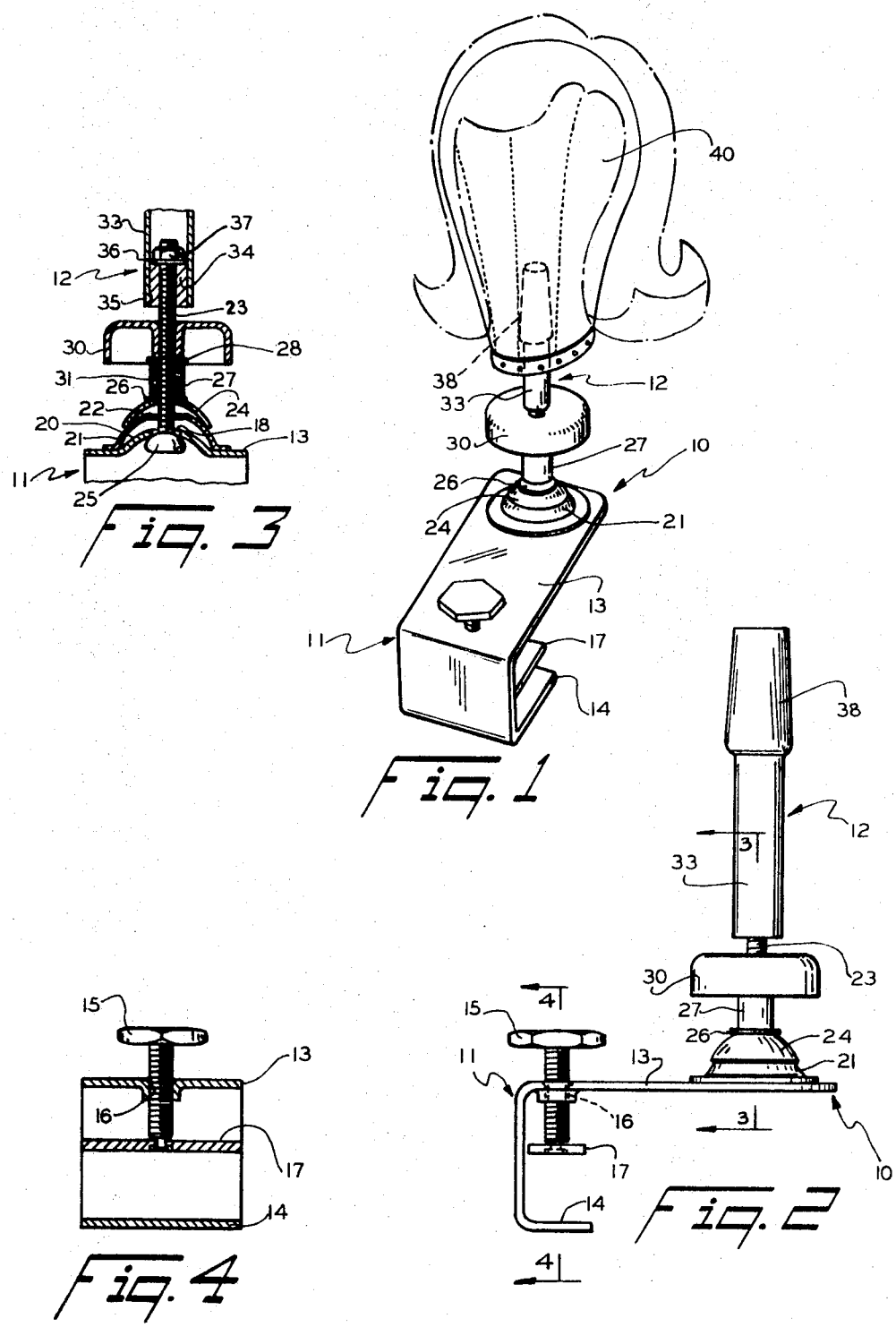
INVENTORS.
ROBERT J. GENTILE &
ARTHUR G. MARTINEAU JR.
BY Bruns and Jenney
att'ys

ANGULARLY ADJUSTABLE WIG BLOCK SUPPORT

BACKGROUND OF THE INVENTION

This invention relates to angularly adjustable wig block supports, used by wig hair stylists or students of hair styling, and more particularly to a support which may be unlocked and locked in position with one hand and at the same time may be tilted with the same hand thus saving time for the operator.

Prior art angularly adjustable block supports comprise a vertically extending shaft which is secured at its lower end to a base by a ball and socket joint. The ball is on the end of the shaft and the socket is on the base, the socket being formed in two parts clampable about the ball by a nut threaded to a member secured to one of socket parts.

The nut is carried on the socket of the base and one hand of the operator is required for locking and unlocking of the clamp and the other hand is required for tilting of the shaft, so that the operator must drop all implements while adjusting the support.

SUMMARY OF THE INVENTION

This invention contemplates forming the base with spherically curved annular portions through which the lower threaded end of the shaft extends. Spherically rounded, annular members carried on the threaded shaft above and below the base annular portions are squeezed against the annular portions by a nut threaded on the shaft itself.

In the preferred embodiment the annular member carried at the lower end of the shaft is convexly rounded and secured to the end of the shaft. The lower portion of the base is concavely rounded to contain the member secured to the shaft and the hole therethrough is sufficiently large to allow tilting of the shaft.

The upper annular portion of the base is spaced above the lower annular portion and has its upper surface convexly rounded. The annular member above the base has a concavely rounded lower surface for engaging the surface of the base annular portion. The hole through this upper annular portion is also large enough to allow tilting of the shaft and the hand wheel nut is carried above the upper annular member.

The nut being above the base, the base may be mounted above the table or bench surface and, the nut being threaded on the shaft, the operator's one hand can simultaneously unlock and tilt the shaft and then relock it. Comb, brush or other implement may remain grasped in the other hand and need not be put down.

BRIEF DESCRIPTION OF THE DRAWINGS

FIG. 1 is a perspective view of a support according to the invention with a block secured thereon;

FIG. 2 is a side elevational view of the device of FIG. 1;

FIGS. 3 and 4 are sectional views on the lines 3—3 and 4—4, respectively, of FIG. 2.

DESCRIPTION OF THE PREFERRED EMBODIMENT

Referring to FIGS. 1—4, the device 10 comprises a base denoted 11 and a vertical shaft denoted 12.

Base 11 has a horizontally extending plate 13 adapted to be secured above the working surface of a table or bench, not shown, the outer end of plate 13 being bent down and then back inward to form a foot 14 of a conventional securing clamp. A fastening screw 15, having an enlarged head, passes down through a threaded hole 16 in the plate 13 and a clamping plate 17 is rotatably secured to the end of screw 15 for engaging the table top.

Referring to FIG. 3, the inner end of plate 13 has a hole 18 therethrough and the annular portion 20 of plate 13 around the hole 18 is stamped upward to form a spherically curved concave recess in the lower surface of the plate.

Around the portion 20 an annular cup-shaped piece of metal, more deeply cupped than the annular portion 20 is incorporated by welding to plate 13 to form another upwardly projecting, spherically rounded portion 21 of the base plate whose top is spaced above the concave portion 20. Portion 21 has a hole 22 therethrough larger than hole 18.

The lower portion 23 of shaft 12 is threaded and passes through the holes in portions 20 and 21, the holes being sufficiently larger than the shaft to allow the latter to be tilted.

Shaft portion 23 carries thereon an annular cupped washer 24 having a spherically rounded under surface adapted to contact the upper surface of base portion 21. The hole through washer 24 closely embraces the shaft portion 23.

Below plate 13, shaft portion 23 carries thereon, and has secured thereto an annular member 25 at its lower end. Member 25 may take the from of a piece welded to the shaft or a nut threaded on and otherwise secured to the shaft. In any event member 25 has a convexly and spherically curved upper surface and preferably is proportioned to be wholly contained in the concavity of plate portion 20.

Above member 24, the shaft portion 23 carries successively a first washer 26, a tubular sleeve 27, a second washer 28, and an enlarged, wheel-shaped locking nut 30 whose hub is in threaded engagement with the shaft. Shaft portion 23 is also encircled by a compression coil spring 31 within the sleeve 27, the normal extended length of the spring being greater than the length of the sleeve.

Above nut 30, shaft portion 23 is secured to the enlarged, tubular, upper portion 23 of shaft 12. In the embodiment shown shaft portion 23 is threaded into a cylindrical plug 34 which is pressed into the end of shaft portion 33 and secured therein by staking at 35. Above the plug 34, shaft portion 23 bears a lock washer 36 and nut 37 for locking the shaft portions together.

The upper portion 33 of shaft 12 extends upward to a tapered tip portion 38 which fits into the usual tapered socket in the bottom of the block 40, as shown in FIG. 1.

In operation, the securing clamp 14—15 is tightened over the edge of a work table securing the plate 13 somewhat above the surface of the table. The block 40 is placed on the upper tip 38 of the shaft 12.

When nut 30 is loosened, the shaft may be tilted because the shaft portion 23 is spaced from the edges of the holes 18 and 22 in plate portions 20 and 21, annular member 24 sliding on the upper convex surface of plate portion 21.

Since spring 31 is longer than sleeve 27, washer 26 and member 24 will be biased downward and member 24 will frictionally engage plate portion 20 even when nut 30 is backed off. Shaft 12 may, therefore, be tilted and be frictionally held in position for working on the wig, if desired.

Shaft 12 may be locked into any angularly tilted position, moreover, by tightening nut 30 against the sleeve 27 forcing washer 26 and annular member 24 downward and clamping member 24 against plate portion 21. The lower end of shaft portion 23 cannot be withdrawn through the hole 18 in plate 13 because of the annular member 25, which is larger than hole 18, and the shaft may be tilted in any direction because of the reversely curved adjacent surfaces of member 25 and plate portion 20.

We claim:

1. In an angularly adjustable wig block support bracket having an elongated shaft adapted at its upper end to be removably secured to wig block and having a base adapted to be secured on a supporting surface, the shaft being adjustably secured to the base at its lower end, the improvement comprising: the base having a horizontally disposed support plate and means for securing the plate above the supporting surface, the plate having upper and lower annular portions spherically curved, the lower portion forming a concavity in the bottom surface of the plate and the upper portion being fixed to the lower portion and having the top of its upper convex surface spaced above the lower portion, upper and lower spherically curved annular members contacting the annular portions, the lower member being fixed on the lower end of the shaft and having its top convexly rounded for tiltable contact with the lower portion concavity, the upper member having its lower surface concave for sliding contact with the upper portion, the shaft having a reduced threaded portion passing through the plate annular potions and the annular members, a nut having a circumference greater than the annular portions and members threadedly carried on the threaded portion above the upper annular member for moving it axially of the shaft, and a tubular spacer around the shaft between the nut and the upper member, the upper annular portion being spaced from and around the threaded portion of the shaft, whereby the nut may be tightened and loosened and the shaft tilted at the same time with a single hand by the operator.

2. A wig block support bracket as defined in claim 1 characterized by the threaded portion of the shaft carrying a compression coil spring normally longer than the spacer and therewithin, whereby the annular members are biased against the annular portions when the nut is first loosened to unlock the shaft for tilting for providing frictional resistance to tilting of the shaft.